(12) United States Patent
Lee et al.

(10) Patent No.: US 10,608,296 B2
(45) Date of Patent: Mar. 31, 2020

(54) BATTERY MODULE

(71) Applicant: LG CHEM, LTD., Seoul (KR)

(72) Inventors: Gang-U Lee, Daejeon (KR); Ki-Youn Kim, Daejeon (KR); Duck-Hee Moon, Daejeon (KR); Jun-Yeob Seong, Daejeon (KR); Sung-Chun Yu, Daejeon (KR); Jung-Hang Lee, Daejeon (KR); Sang-Yoon Jeong, Daejeon (KR); Yong-Joon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 248 days.

(21) Appl. No.: 15/574,314

(22) PCT Filed: Jun. 14, 2016

(86) PCT No.: PCT/KR2016/006311
§ 371 (c)(1),
(2) Date: Nov. 15, 2017

(87) PCT Pub. No.: WO2016/204491
PCT Pub. Date: Dec. 22, 2016

(65) Prior Publication Data
US 2018/0138562 A1 May 17, 2018

(30) Foreign Application Priority Data
Jun. 16, 2015 (KR) .................. 10-2015-0085237

(51) Int. Cl.
*H01M 10/613* (2014.01)
*H01M 10/6556* (2014.01)
(Continued)

(52) U.S. Cl.
CPC ........... *H01M 10/613* (2015.04); *H01M 2/10* (2013.01); *H01M 2/1077* (2013.01);
(Continued)

(58) Field of Classification Search
None
See application file for complete search history.

(56) References Cited

U.S. PATENT DOCUMENTS 7,807,288 B2   10/2010  Yoon et al.
2007/0015049 A1*  1/2007  Hamada ............ H01M 2/1077
                                                    429/120
(Continued)

FOREIGN PATENT DOCUMENTS

KR   10-2006-0090469 A    8/2006
KR   10-2007-0112489 A   11/2007
(Continued)

OTHER PUBLICATIONS

International Search Report for PCT/KR2016/006311 (PCT/ISA/210) dated Oct. 4, 2016.

*Primary Examiner* — Devina Pillay
(74) *Attorney, Agent, or Firm* — Birch, Stewart, Kolasch & Birch, LLP

(57) ABSTRACT

Provided is a battery module suitable for cooling battery cells between battery cartridges within a short period of time by including cooling ducts at side portions of the battery cartridges to restrict inflow of air from the cooling ducts to air paths of the battery cartridges. The battery module includes: a battery stack including battery cartridges having air induction holes protruding from grooves at side surfaces of the battery cartridges and air paths communicating with the air induction holes, at least one battery cell alternately stacked with the battery cartridges; a sealing member including an outer sealing frame and sealing ribs located in the grooves of the battery stack, and middle sealing frames located between the air induction holes; and a cooling duct including a groove portion covering the grooves and accommodating the outer sealing frame.

16 Claims, 6 Drawing Sheets

(51) Int. Cl.
*H01M 10/6552* (2014.01)
*H01M 2/10* (2006.01)
*H01M 10/625* (2014.01)

(52) U.S. Cl.
CPC ....... *H01M 2/1088* (2013.01); *H01M 10/625* (2015.04); *H01M 10/6552* (2015.04); *H01M 10/6556* (2015.04); *H01M 2220/20* (2013.01)

(56) References Cited

U.S. PATENT DOCUMENTS

| | | |
|---|---|---|
| 2008/0299449 A1* | 12/2008 | Yun ................ H01M 2/1077 429/120 |
| 2009/0214936 A1 | 8/2009 | Yang et al. |
| 2011/0244298 A1 | 10/2011 | Guener et al. |
| 2014/0295227 A1 | 10/2014 | Aoki |
| 2015/0099146 A1* | 4/2015 | Kim ..................... H01M 2/12 429/53 |
| 2015/0140408 A1 | 5/2015 | Hayashida et al. |
| 2015/0147639 A1 | 5/2015 | Uchida et al. |

FOREIGN PATENT DOCUMENTS

| | | |
|---|---|---|
| KR | 10-2011-0089869 A | 8/2011 |
| KR | 10-2014-0141825 A | 12/2014 |
| KR | 10-2014-0144787 A | 12/2014 |
| KR | 10-2015-0025308 A | 3/2015 |

* cited by examiner

BATTERY MODULE

TECHNICAL FIELD

The present disclosure relates to a battery module suitable for increasing cooling efficiency of cooled structures through a cooling structure by bringing the cooling structure into close contact with the cooled structures.

The present application claims priority to Korean Patent Application No. 10-2015-0085237 filed on Jun. 16, 2015 in the Republic of Korea, the disclosure of which is incorporated herein by reference.

BACKGROUND ART

Recently, in order to reduce air pollution caused by exhaust gases of vehicles, the vehicles are being manufactured based on studies for securing driving power by using an internal combustion engine and/or an electric motor. In this regard, the vehicles have been evolved in an order of a hybrid vehicle, a plug-in hybrid vehicle, and an electric vehicle. In this case, the hybrid vehicle and the plug-in hybrid vehicle include an internal combustion engine, an electric motor, and a battery pack, and the electric vehicle includes an electric motor and a battery pack without an internal combustion engine.

In addition, the battery pack has been evolved together with the hybrid vehicle, the plug-in hybrid vehicle, and the electric vehicle. The battery pack is configured to be chargeable outside and/or inside of the electric vehicle. The battery pack includes a cooling structure and a battery module, and the cooling structure surrounds the battery module. The battery module includes battery accommodation structures (for example, cartridges) that are sequentially stacked on each other, and battery cells between the battery accommodation structures. The battery cells externally generate heat via repeated charging and discharging. At this time, the cooling structure cools the battery cells via a heat exchange, by exchanging heat with the battery cells by using external air while the battery module is driven.

Accordingly, a shape of the cooling structure largely affects cooling effects of the battery cells per unit time. A lot of studies related to the shape of the cooling structure are being conducted. An example of the studies is KR 10-2014-0141825 (published on Dec. 11, 2014) entitled "Secondary Battery and Battery Module Having the Same". The battery module includes elastic pads, battery cells, cover members, and frame members. The elastic pads have a ring shape and are sequentially stacked on each other in the battery module, and the battery cells are located between the elastic pads to expose sealing units through the elastic pads.

The cover members are located below and above the elastic pads to surround the elastic pads in a sandwich structure. The frame members have a shape of '[', and accommodates the elastic pads, the battery cells, and the cover members by being located along edges of the battery cells and cover members. Here, the elastic pads and the cover members fix the battery cells inside the frame members, and the cover members cools the battery cells via a heat exchange, by exchanging heat with external air.

However, since the battery cells are surrounded by the elastic members, the cover members, and the frame members, heat of the battery cells are gradually accumulated between the elastic members, the cover members, and the frame members while the battery module is driven. The accumulated heat of the battery cells not only degrades electric characteristics of the battery cells, but also changes shapes of the elastic members, the cover members, and the frame members.

DISCLOSURE

Technical Problem

The present disclosure is designed based on the background art described above, and is directed to providing a battery module suitable for adequately cooling battery cells through battery cartridges by including the battery cells between the battery cartridges that are sequentially stacked on each other.

Technical Solution

In one aspect of the present disclosure, there is provided a battery module including: a battery stack including: battery cartridges having grooves recessed from side surfaces of the battery cartridges to be opened vertically at the side surfaces, air induction holes protruding from bottoms of the grooves, and air paths communicating with opening holes of the air induction holes; and at least one battery cell alternately stacked with the battery cartridges; a sealing member including an outer sealing frame located along edges of the grooves of the battery stack, sealing ribs perpendicularly protruding from the outer sealing frame around boundaries of adjacent grooves, and middle sealing frames located between adjacent air induction holes; and a cooling duct including an air access hole covering the grooves and communicating with the air induction holes, and including a groove portion located along the outer sealing frame to accommodate the outer sealing frame.

According to the present disclosure, the grooves may be located at two facing side surfaces of the battery cartridges.

Preferably, the two grooves may be located each of two facing side surfaces of the battery cartridges.

According to the present disclosure, the air induction holes may include rectangular walls defining the opening holes.

Preferably, the rectangular walls may include pairs of base walls having inclines forming certain angles with the bottoms of the grooves and spaced apart from each other by heights of the opening holes, and pairs of flanges connecting two end portions of the pairs of base walls.

According to the present disclosure, the battery cartridges may include the air paths between lower cooling fins and upper cooling fins spaced apart from each other at certain intervals, and edges of the lower cooling fins and edges of the upper cooling fins may be fixed to borders of the battery cartridges.

According to the present disclosure, the outer sealing frame may be located, roughly in a quadrangular shape at the bottoms of the grooves, on the side surfaces of the battery cartridges, and pass boundaries of the battery cartridges.

According to the present disclosure, the sealing ribs may be located roughly parallel to the boundaries of the grooves, on the side surfaces of the battery cartridges.

According to the present disclosure, the middle sealing frames may be located along boundaries of the adjacent air induction holes to contact the corresponding sealing ribs.

According to the present disclosure, the cooling duct may include a pair of connector boards defining the groove portion.

Preferably, the cooling duct may be adhered to the battery cartridges through the pair of connector boards to cover the grooves.

According to the present disclosure, the pair of connector boards may protrude from the cooling duct towards the grooves.

Preferably, the cooling duct may further include accommodation boards respectively located perpendicular to the pair of connector boards and extending from the pair of connector boards to two side portions, and the accommodation boards may be fixed to side walls of the battery stack around the grooves.

According to the present disclosure, a thickness of the cooling duct may gradually decrease from an uppermost battery cartridge to a lowermost battery cartridge when viewed from a stack direction of the battery cartridges.

Advantageous Effects

A battery module according to the present disclosure includes battery cartridges that are sequentially stacked on each other, battery cells between the battery cartridges, and cooling ducts located at two side portions of the battery cartridges, and since the battery module has an air path penetrating one side surface and another side surface of the battery cartridge, the battery module may effectively cool the battery cells through air flowing along the cooling ducts and the battery cartridges by communicating the cooling ducts and the battery cartridges.

A battery module according to the present disclosure has a groove at a side surface of a battery cartridge facing a cooling duct, and includes a sealing member passing boundaries of battery cartridges at the groove and located between the battery cartridges, and accordingly, the battery module may maintain close contact of the battery cartridges and the cooling duct by bringing the cooling duct into contact with the sealing member.

Since a battery module according to the present disclosure includes a sealing member along a stacked direction of battery cartridges, the battery module may cool battery cells inserted between the battery cartridges to an adequate temperature within a short period of time by concentrating air flowing along cooling ducts and the battery cartridges while the battery module is driven to air paths of the battery cartridges.

Since a battery module according to the present disclosure includes a sealing member passing boundaries of battery cartridges between the battery cartridges and cooling duct, the battery module blocks external air directly flowing in through an edge of the cooling duct without passing through an air access hole of the cooling duct such that a cooling degree of battery cells per unit time is estimated.

A battery module according to the present disclosure includes a groove at a side surface of each of battery cartridges, and adheres a cooling duct to the battery cartridges by a depth of the groove such that a shape of the battery module is entirely compact, and accordingly, an installation space of the battery module may be efficiently increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one or more embodiments described below, a battery cell denotes a lithium secondary battery. Here, the lithium secondary battery refers to a secondary battery in which lithium ions act as working ions during charging and discharging to induce an electrochemical reaction in a positive electrode and a negative electrode. However, it is obvious that the present disclosure is not limited by a type of battery.

Figure 1:
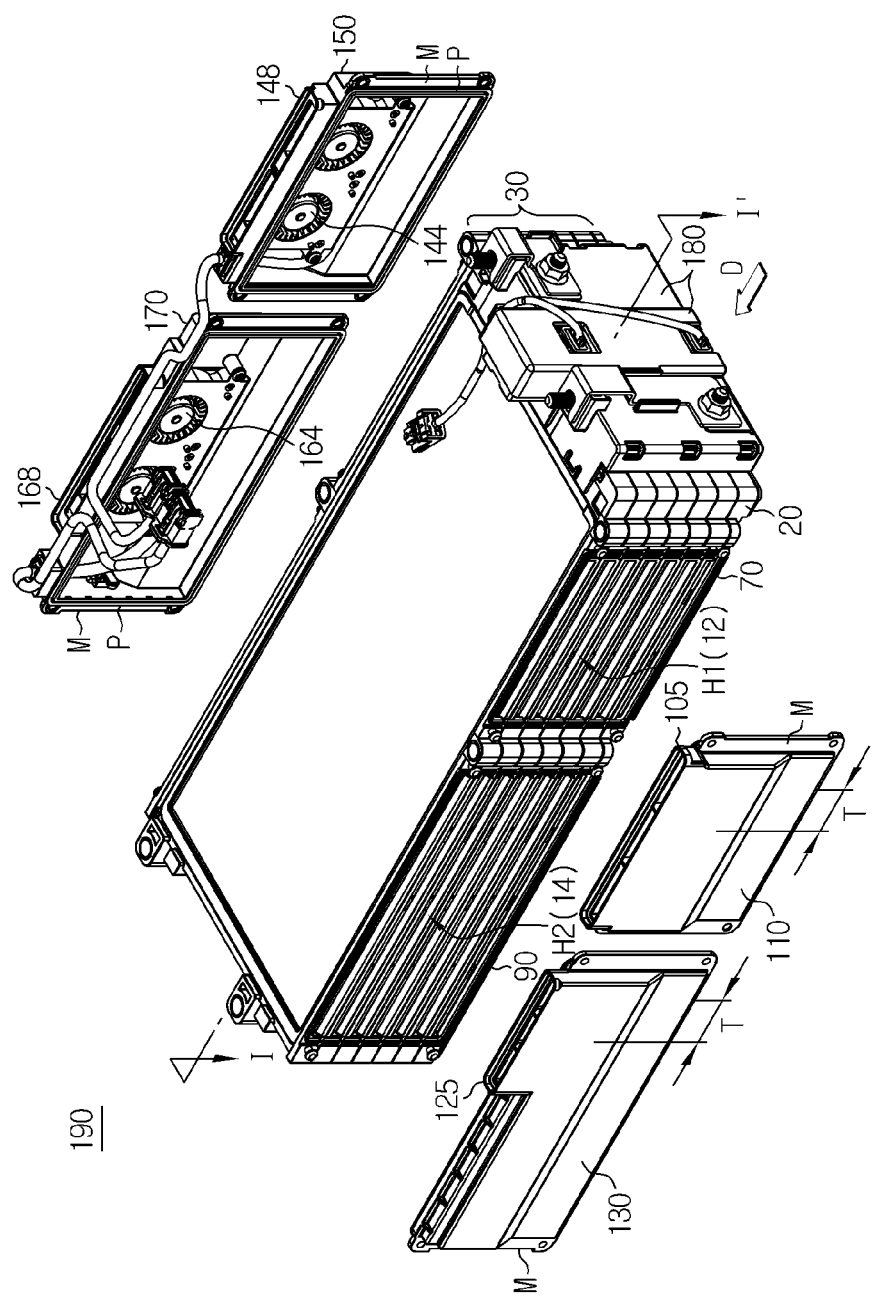
FIG. 1 is an exploded perspective view of a battery module according to an embodiment of the present disclosure.

FIG. 1 is an exploded perspective view of a battery module according to an embodiment of the present disclosure.

Referring to FIG. 1, a battery module 190 according to the present disclosure includes a battery stack 30, sealing members 70 and 90, cooling ducts 110, 130, 150, and 170, and a circuit unit 180. The battery stack 30 includes battery cartridges 20 and battery cells 4 and 8 of FIG. 2. The battery cartridges 20 are sequentially stacked in the battery stack 30. Each of the battery cartridges 20 includes air induction holes 12 and 14.

Figure 2:
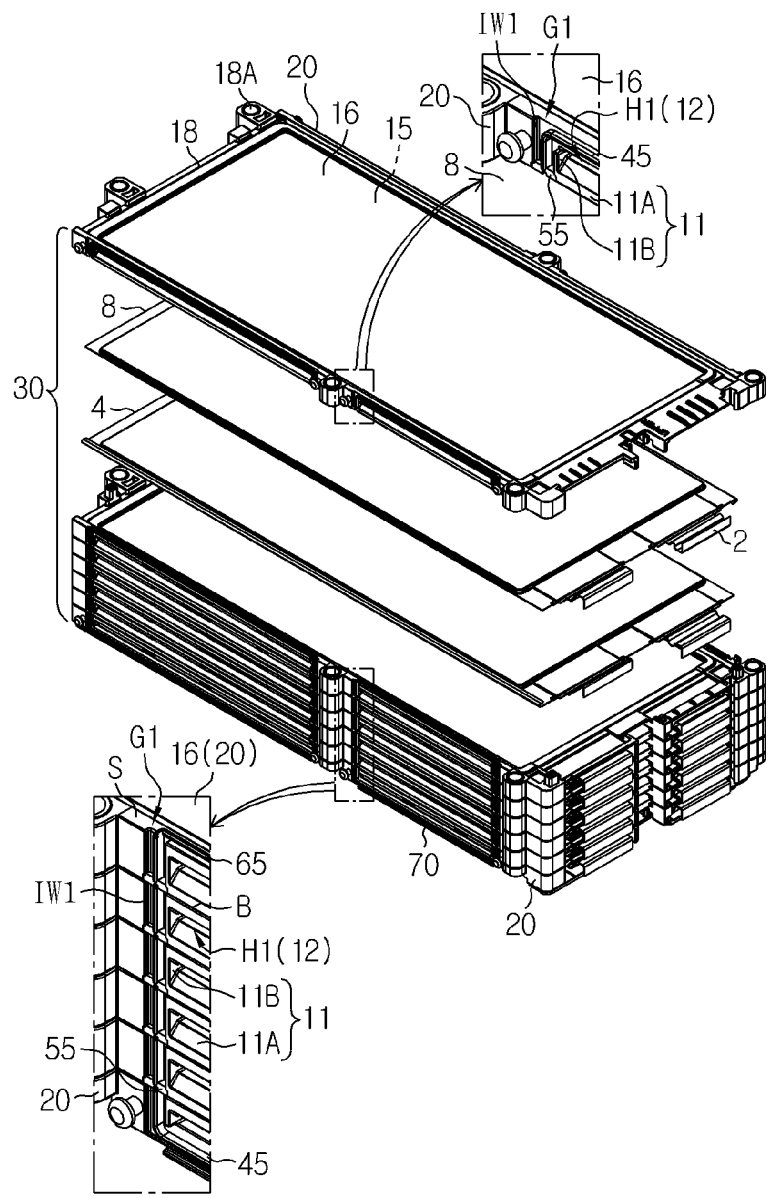
FIG. 2 is an enlarged exploded perspective view of battery stack and a first sealing member of the battery module of FIG. 1.
Figure 3:
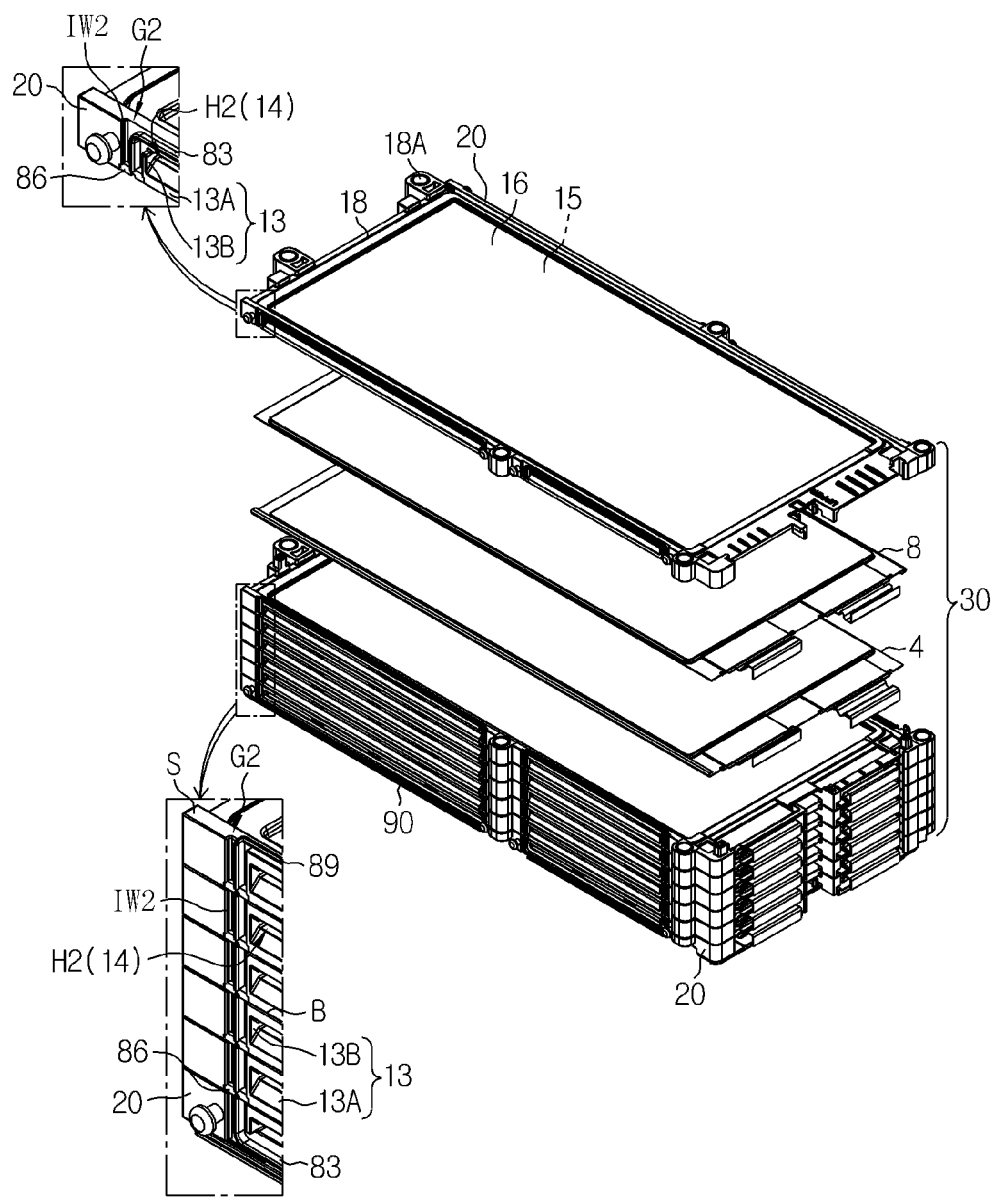
FIG. 3 is an enlarged exploded perspective view of the battery stack and a second sealing member of the battery module of FIG. 1.

Preferably, the air induction holes 12 and 14 are externally opened, as shown in FIGS. 2 and 3, towards two side portions by being located at edges of the battery cartridge 20. According to an embodiment, the air induction holes 12 and 14 communicate with air paths (not shown) provided inside the battery cartridge 20, through opening holes H1 and H2. The battery cells 4 and 8 are located between the battery cartridges 20.

For example, the two battery cells 4 and 8 are mounted between the two adjacent battery cartridges 20 as shown in FIG. 2, and the two battery cells 4 and 8 are in contact face-to-face between the battery cartridges 20. The sealing members 70 and 90 are located between the battery stack 30 and the cooling ducts 110, 130, 150, and 170. Preferably, the sealing members 70 and 90 are distinguished into first sealing members 70 and second sealing members 90.

The first sealing members 70 are located between the battery stack 30 and the first left and right cooling ducts 110 and 150 of the battery stack 30 in an arrangement order in a direction indicated by an arrow D. The second sealing members 90 are located between the battery stack 30 and the second left and right cooling ducts 130 and 170 of the battery stack 30 in the arrangement order in the direction indicated by the arrow D.

According to an embodiment, excluding a case in which the cooling ducts 110, 130, 150, and 170 pass air from outside to inside based on a design purpose, the first and second sealing members 70 and 90 are configured to block direct inflow of air from outside of the cooling ducts 110, 130, 150, and 170 to spaces between the battery stack 30 and the cooling ducts 110, 130, 150, and 170.

Preferably, the first and second sealing members 70 and 90 are formed of one of glue, rubber, silicon, and poly urethane. The cooling ducts 110, 130, 150, and 170 may contact the battery cartridges 20 by being located at two side portions of the battery stack 30. Preferably, the cooling ducts 110, 130, 150, and 170 are opened towards combining regions of the battery cartridges 20.

According to an embodiment, the cooling ducts 110, 130, 150, and 170 respectively include air access holes 105, 125, 148, and 168 opened in a stacked direction of the battery cartridges 20 around the uppermost battery cartridge 20 from among the battery cartridges 20. Here, the cooling ducts 110, 130, 150, and 170 are each thicker by a certain thickness T at a lower portion than an upper portion.

Accordingly, the cooling ducts 110, 130, 150, and 170 are able to uniformly control a flow rate of air in an up-and-down direction according to a thickness difference between the lower portion and the upper portion, while sucking or discharging air through the air access holes 105, 125, 148, and 168. According to another embodiment, the cooling ducts 110, 130, 150, and 170 include pairs of connector boards P located along edges of regions opened towards the battery stack 30, and accommodation boards M protruding from the connector boards P and facing face-to-face with partial regions of side surfaces of the battery stack 30.

According to another embodiment, some cooling ducts 150 and 170 from among the cooling ducts 110, 130, 150, and 170 include blast fans 144 and 164. When the blast fans 144 and 164 are driven, the cooling ducts 110 and 130 suck air through the air access holes 105 and 125 from the outside, the air reaches the cooling ducts 150 and 170 from the cooling ducts 110 and 130 through the air induction holes 12 and 14 and air paths of the battery cartridges 20, and the cooling ducts 150 and 170 discharge the air from the inside to the outside through the air access holes 148 and 148.

The circuit unit 180 is located at a front end of the battery stack 30 to be electrically connected to an electrode leads 2 of FIG. 2 of the battery cells 4 and 8. The circuit unit 180 is configured to sense a voltage of the battery cell 4 or 8 through the electrode leads 2 of the battery cells 4 and 8 in the battery cartridges 20, and output a sensing signal to the outside.

FIG. 2 is an enlarged exploded perspective view of battery stack and a first sealing member of the battery module of FIG. 1.

Referring to FIG. 2, in the battery stack 30, the battery cartridges 20 accommodate the two battery cells 4 and 8 between the two battery cartridges 20, by using two battery cartridges 20 as one unit. The battery cartridges 20 have first grooves G1 on parts of side walls of the battery stack 30. In other words, the first grooves G1 are located on two facing side surfaces of the battery cartridge 20.

Preferably, the first groove G1 is recessed by a certain depth into the battery cartridge 20 from the side surface of the battery cartridge 20. According to an embodiment, the first groove G1 is vertically opened and has left and right internal walls IW1 parallel to the stacked direction of the battery cartridges 20.

Here, the first grooves G1 communicate with each other along the stacked direction of the battery cartridges 20, and accommodate the first sealing member 70 between the internal walls IW1 and the bottoms in the battery cartridges 20. Also, the battery cartridges 20 include a lower cooling fin 15 and an upper cooling fin 16 parallel to each other and spaced apart from each other by a certain interval at a lower portion and an upper portion of an outer frame 18. An edge of the lower cooling fin 15 and an edge of the upper cooling fin 16 are fixed to the outer frame 18 via an insert injection process or the like.

The lower cooling fin 15 and the upper cooling fin 16 define an air path (not shown) forming a horizontal flow path of air in the battery cartridge 20. The air path communicates with the air induction holes 12 each located on two side surfaces of the battery cartridge 20. Preferably, the air induction holes 12 protrude towards a side portion of the battery cartridge 20 from the bottom of the first groove G1.

According to an embodiment, the air induction hole 12 has an opening hole H1 having a slit shape on the outer frame 18 of the battery cartridge 20 so as to expose the air path between the lower cooling tin 15 and the upper cooling fin 16 to the outside of the battery cartridge 20. The opening hole H1 is defined by a wall 11 having a rectangular shape protruding from the bottom of the first groove G1.

The wall 11 has an incline forming a certain angle with respect to the bottom of the first groove G1, and includes a pair of base walls 11A spaced apart from each other by a height of the opening hole H1, and a flange 11B located parallel to the internal wall IW1 of the first groove G1 and connecting two end portions of the pair of base walls 11A.

Meanwhile, the first sealing member 70 is located, in the battery cartridges 20, between the internal walls IW1 of the first grooves G1 and the flanges 11B of the opening holes H1, on a bottom surface of the first groove G1 below the base wall 11A of the lowest battery cartridge 20, and on a bottom surface of the first groove G1 on the base wall 11A of the uppermost battery cartridge 20.

Also, the first sealing member 70 is located on boundaries B of the first grooves G1 so as to be located between contacting regions of the base walls 11A in the battery cartridges 20. In detail, the first sealing member 70 includes an outer sealing frame 45, sealing ribs 55, and middle sealing frames 65.

The outer sealing frame 45 is located between the internal walls IW1 of the first grooves G1 and the walls 11 of the opening holes H1, on the bottom surface of the first groove G1 along a length direction of the wall 11 below the base wall 11A of the lowermost battery cartridge 20, and on the bottom surface of the first groove G1 along the length direction of the wall 11 on the base wall 11A of the uppermost battery cartridge 20.

Preferably, the outer sealing frame 45 passes the boundaries B of the battery cartridges 20 by being located, roughly in a quadrangular shape on bottoms of the first grooves G1, on the side surfaces of the battery cartridges 20. The sealing ribs 55 each protrude towards the internal walls IW1 of the first grooves G1 and the flanges 11B of the walls 11 from the outer sealing frame 45 around contacting regions of the flanges 11B.

Preferably, the sealing ribs 55 are approximately parallel to the boundaries B of the first grooves G1 on the side surfaces of the battery cartridges 20. According to an embodiment, the sealing ribs 55 protrude perpendicularly from the outer sealing frame 45 around the boundaries B of the adjacent first grooves G1.

The middle sealing frames 65 are located in the boundaries B of the first grooves G1 to contact the outer sealing frame 45 and the sealing ribs 55 at the contacting regions of the flanges 11B. Preferably, the middle sealing frame 65 is located along the boundary B of the battery cartridges 20 on a boundary surface S of the battery cartridges 20.

According to an embodiment, the middle sealing frame 65 is located between the adjacent air induction holes 12. According to another embodiment, the middle sealing frame 65 is located along the boundary B of the adjacent air induction holes 12 to contact the corresponding sealing rib 55.

FIG. 3 is an enlarged exploded perspective view of the battery stack and a second sealing member of the battery module of FIG. 1.

Referring to FIG. 3, in the battery stack 30, the battery cartridges 20 include second grooves G2 spaced apart from the first grooves G1 of FIG. 2. Here, the battery cartridges 20 include the second grooves G2 on the side walls of the battery stack 30. In other words, the second grooves G2 are located on two facing side surfaces of the battery cartridges 20.

Preferably, the second groove G2 is recessed by a certain depth into the battery cartridge 20 from the side surface of the battery cartridge 20. According to an embodiment, the second groove G2 is vertically opened and includes left and right internal walls IW2 parallel to the stacked direction of the battery cartridges 20.

Here, the second grooves G2 communicate with each other in the stacked direction of the battery cartridges 20, and accommodate the second sealing member 90 between the internal walls IW2 and bottoms in the battery cartridges 20. Also, the battery cartridges 20 include the lower cooling fins 15 and the upper cooling fins 16 parallel to each other and spaced part from each other by a certain interval at the lower portion and the upper portion of an outer frame 18.

The lower cooling fin 15 and the upper cooling fin 16 define the air path (not shown) forming the horizontal flow path of air in the battery cartridge 20. The air path communicates with the air induction holes 14 each located on two side surfaces of the battery cartridge 20. Preferably, the air induction holes 14 protrude towards a side portion of the battery cartridge 20 from the bottom of the second groove G2.

According to an embodiment, the air induction hole 14 has an opening hole H2 having a slit shape on the outer frame 18 of the battery cartridge 20 so as to expose the air path between the lower cooling fin 15 and the upper cooling fin 16 to the outside of the battery cartridge 20. The opening hole H2 is defined by a wall 13 having a rectangular shape protruding from the bottom of the first groove G1.

The wall 13 has an incline forming a certain angle with respect to the bottom of the second groove G2, and includes a pair of base walls 13A spaced apart from each other by a height of the opening hole H2, and a pair of flanges 13B located parallel to the internal walls IW2 of the second groove G2 and connecting two end portions of the pair of base walls 13A.

Meanwhile, the second sealing member 90 is located, in the battery cartridges 20, between the internal walls IW2 of the second grooves G2 and the flanges 13B of the opening holes H2, on a bottom surface of the second groove G2 below the base wall 13A of the lowest battery cartridge 20, and on a bottom surface of the second groove G2 on the base wall 13A of the uppermost battery cartridge 20. Also, the first sealing member 90 is located on boundaries B of the second grooves G2 so as to be located between contacting regions of the base walls 13A in the battery cartridges 20.

In detail, the second sealing member 90 includes an outer sealing frame 83, sealing ribs 86, and middle sealing frames 89. The outer sealing frame 83 is located between the internal walls IW2 of the second grooves G2 and the walls 13 of the opening holes H2, on the bottom surface of the second groove G2 along a length direction of the wall 13 below the base wall 13A of the lowermost battery cartridge 20, and on the bottom surface of the second groove G2 along the length direction of the wall 13 on the base wall 13A of the uppermost battery cartridge 20.

Preferably, the outer sealing frame 45 passes the boundaries B of the battery cartridges 20 by being located, roughly in a quadrangular shape on bottoms of the second grooves G2, on the side surfaces of the battery cartridges 20. The sealing ribs 86 each protrude towards the internal walls IW2 of the second grooves G2 and the flanges 13B of the walls 13 from the outer sealing frame 83 around contacting regions of the flanges 13B.

Preferably, the sealing ribs 86 are approximately parallel to the boundaries B of the second grooves G2 on the side surfaces of the battery cartridges 20. According to an embodiment, the sealing ribs 86 protrude perpendicularly from the outer sealing frame 83 around the boundaries B of the adjacent second grooves G2.

The middle sealing frames 89 are located in the boundaries B of the second grooves G2 to contact the outer sealing frame 83 and the sealing ribs 86 at the contacting regions of the flanges 13B. Preferably, the middle sealing frame 89 is located along the boundary B of the battery cartridges 20 on the boundary surface S of the battery cartridges 20.

According to an embodiment, the middle sealing frame 89 is located between the adjacent air induction holes 14. According to another embodiment, the middle sealing frame 89 is located along the boundary B of the adjacent air induction holes 14 to contact the corresponding sealing rib 86.

In FIGS. 2 and 3, the first and second sealing members 70 and 90 have been described with respect to the left side wall of the battery stack 30, but the first and second sealing members 70 and 90 may also be provided on the right side wall of the battery stack 30. Here, the left and right side walls of the battery stack 30 have the same structure.

Figure 4:
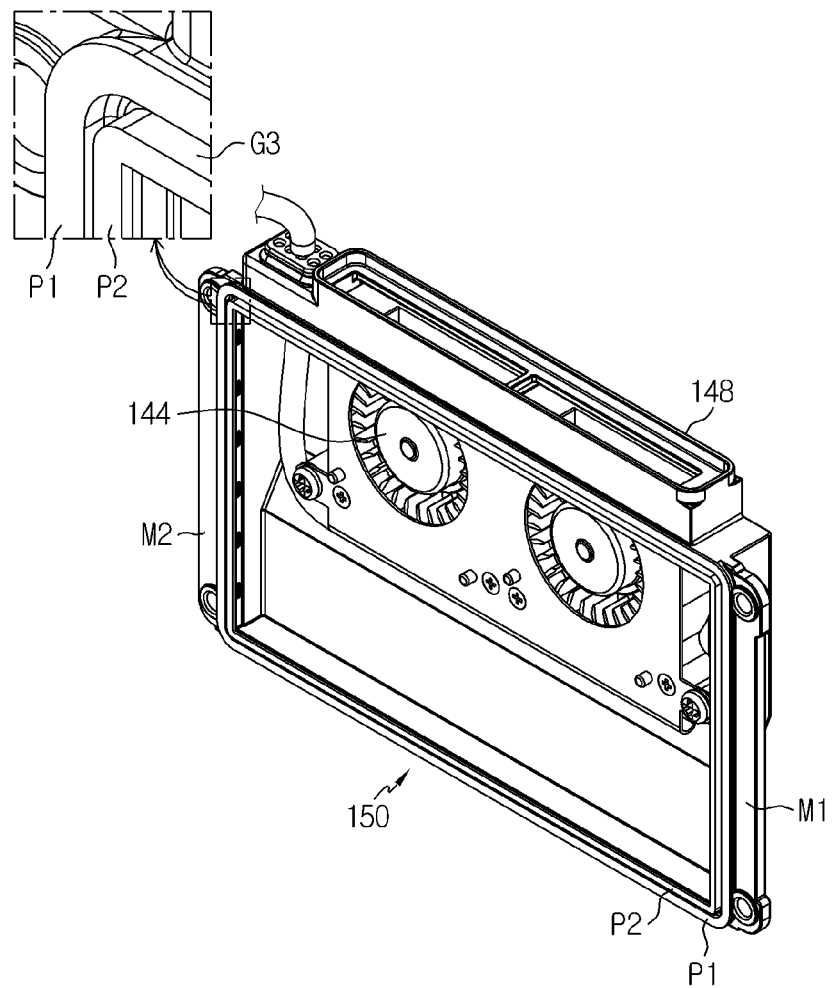
FIG. 4 is an enlarged perspective view of a cooling duct of FIG. 1.

FIG. 4 is an enlarged perspective view of a cooling duct of FIG. 1.

Referring to FIG. 4, the cooling duct 150 is opened towards the battery cartridges 20 of FIG. 1. Also, the cooling duct 150 includes the blast fans 144 and the air access hole 148 above the blast fans 144. The blast fans 144 discharge air to the air access hole 148 of the cooling duct 150 by introducing the air that passed through the air access hole 105 of the cooling duct 110, and the air induction holes 12 and air paths of the battery cartridges 20 from the outside of the cooling duct 110 of FIG. 1 to the cooling duct 150.

According to an embodiment, the cooling duct 150 may cover the first grooves G1 of the battery cartridges 20 by being located on the side surfaces of the battery cartridges 20. According to another embodiment, the cooling duct 150 includes a pair of connector boards P1 and P2 at an edge of the cooling duct 150. The connector boards P1 and P2 are matched to the outer sealing frame 45 of the first sealing member 70 of FIG. 2, and protrude from the edge of the cooling duct 150. End portions of the connector boards P1 and 2 roughly have a quadrangular shape.

Here, the cooling duct 150 includes a groove portion G3 between the connector boards P1 and P2. According to another embodiment, the cooling duct 150 further includes accommodation boards M1 and M2 respectively located perpendicular to the connector boards P1 and P2 and extending from the connector boards P1 and p2 to the two side portions. Meanwhile, each of the cooling ducts 110, 130, and 170 of FIG. 1 has the similar shape as the cooling duct 150. In other words, each of the cooling ducts 110, 130, and 170 includes the connector boards P1 and P2 and the accommodation boards M1 and M2. However, the cooling ducts 110 and 130 do not include a blast fan.

Figure 5:
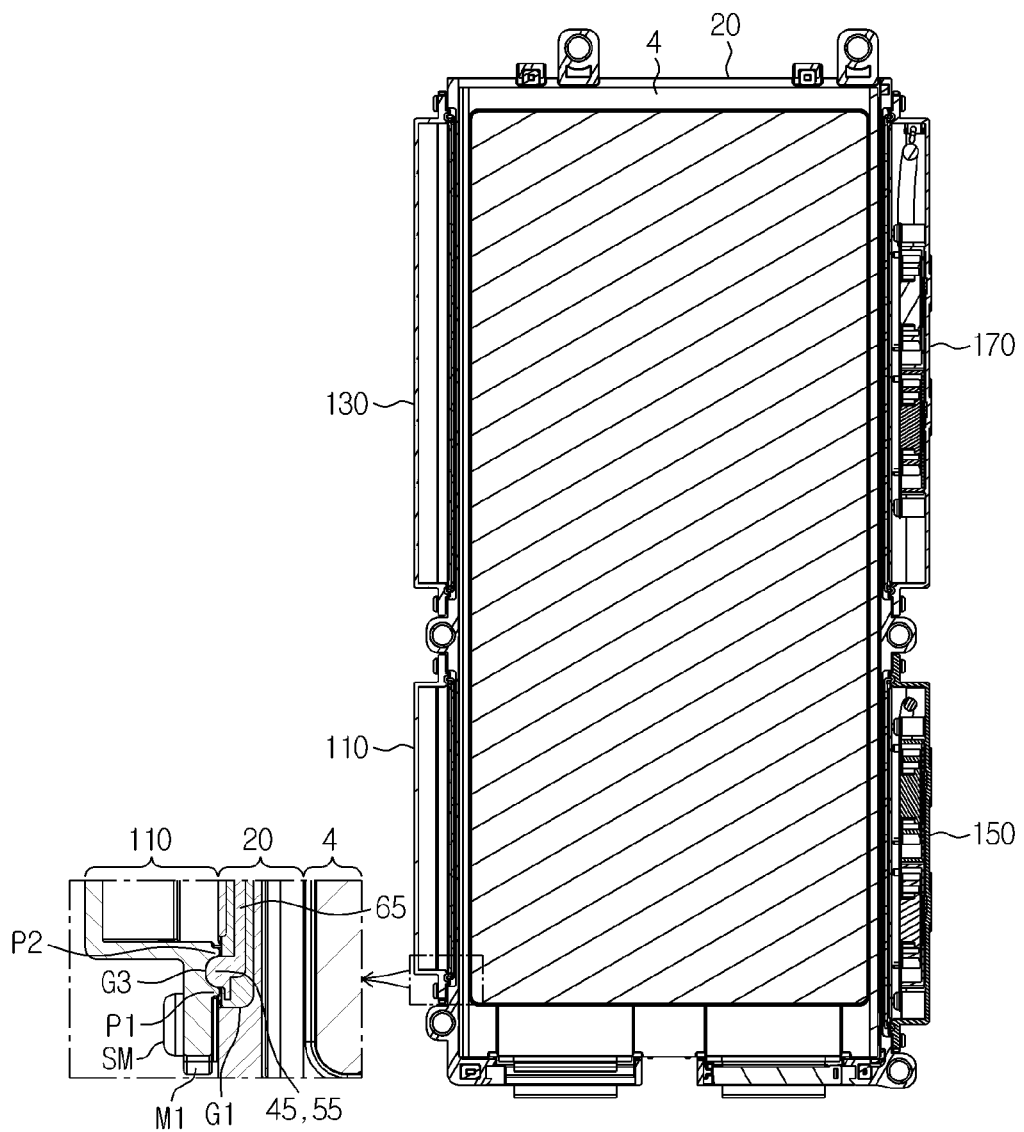
FIG. 5 is a plan view of a combined shape of a battery stack, sealing members, and cooling ducts, which is taken along a line I-I' of FIG. 1.

FIG. 5 is a plan view of a combined shape of a battery stack, sealing members, and cooling ducts, which is taken along a line I-I' of FIG. 1. Here, the line I-I' passes between the battery cartridges of FIG. 1.

Referring to FIG. 5, each of the cooling ducts 110 and 150 covers the first grooves G1 by contacting the first sealing member 70 through the connector boards P1 and P2. Each of the cooling ducts 130 and 170 covers the second grooves G2 by contacting the second sealing member 90 through the connector boards P1 and P2.

Here, since the combined shapes of the cooling ducts 110, 130, 150, and 170 and the battery cartridges 20 are similar to one another, only one cooling duct 110 from among the cooling ducts 110, 130, 150, and 170 will be described for simplification of the description. The cooling duct 110 contacts the outer sealing frame 45 of the first sealing member 70 through the connector boards P1 and P2 along the edges of the first grooves G1 in the battery cartridges 20.

In detail, the cooling duct 110 is adhered to the side wall of the battery stack 30 of FIG. 2 while covering the first grooves G1 through a close contact of the connector boards P1 and P2 and the outer sealing frame 45. Here, the groove portion G3 between the connector boards P1 and P2 is mostly filled by the outer sealing frame 45 of the first sealing member 70, and in detail, is also filled by the outer sealing frame 45 and the sealing ribs 55 around the boundary B of FIG. 2 of the battery cartridges 20.

Preferably, the cooling duct 110 is adhered on the side wall of the battery stack 20 at the left and right of the first grooves G1 through the accommodation boards M1 and M2.

Figure 6:
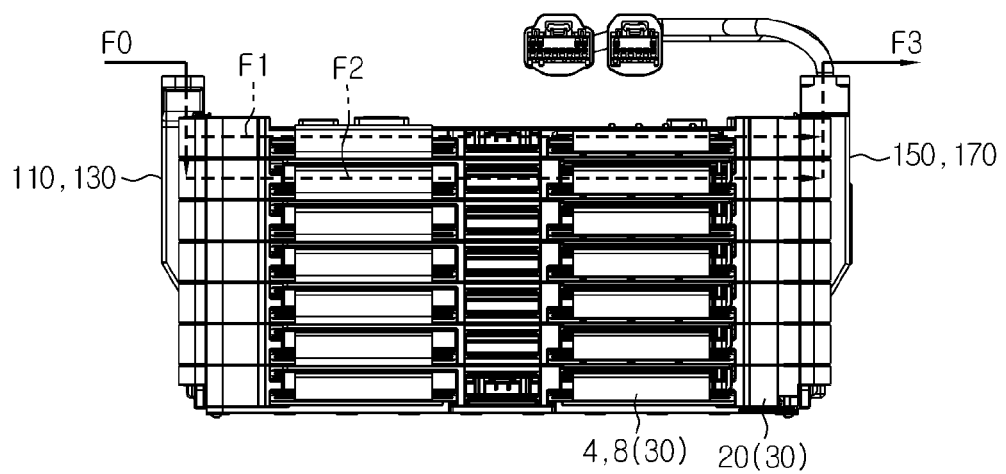
FIG. 6 is a schematic view for describing an assembly method and operation mechanism of a battery stack based on a combined shape of a battery stack, sealing members, and cooling ducts in a direction indicated by an arrow D of FIG. 1.

FIG. 6 is a schematic view for describing an assembly method and operation mechanism of a battery stack based on a combined shape of a battery stack, sealing members, and cooling ducts in the direction indicated by the arrow D of FIG. 1.

Referring to FIG. 6, the battery cartridges 20, the sealing members 70 and 90, and the cooling ducts 110, 130, 150, and 170 may be prepared as shown in FIG. 1. Then, the battery cartridges 20 may be sequentially stacked on each other. At this time, the battery cells 4 and 8 may be inserted between the battery cartridges 20. The battery cells 4 and 8 and the battery cartridges 20 may form the battery stack 30.

While and after forming the battery stack 30, the sealing member 70 may be formed into the middle sealing frames 65 of FIGS. 2 and 3 between the battery cartridges 20, formed into the outer sealing frame 45 of FIG. 2 along the edges of the first grooves G1 of FIG. 2 in the battery cartridges 20, and formed into the sealing ribs 55 around the boundary B of FIG. 2 of the battery cartridges 20.

Also, the sealing member 90 may be formed into the middle sealing frames 89 of FIG. 3 between the battery cartridges 20, formed into the outer sealing frame 83 of FIG. 3 along the edges of the second grooves G2 of FIG. 3 in the battery cartridges 20, and formed into the sealing ribs 86 around the boundary B of FIG. 3 of the battery cartridges 20. Next, the cooling ducts 110, 130, 150, and 170 may be adhered to the two side walls of the battery stack 30.

Here, the connector boards P1 and P2 of FIG. 4 of the cooling ducts 110, 130, 150, and 170 may closely contact the outer sealing frames 45 and 83 and the sealing ribs 55 and 86 of the sealing members 70 and 90. Also, the accommodation boards M1 and M2 of FIG. 4 of the cooling ducts 110, 130, 150, and 170 may be fixed to the battery stack 30 by using a screw member SM of FIG. 5.

Then, long bolts (not shown) may be fastened to the battery stack 30. The long bolts may tightly fix the battery cartridges 20 in a vertical direction by being inserted into long bolt fastening holes 18A of FIG. 2 or 3 of the outer frames 18 of FIG. 2 or 3.

According to the present disclosure, when the blast fans 144 and 164 of the cooling ducts 150 and 170 are driven, the cooling ducts 110 and 130 may suck external air through the air access holes 105 and 125. Here, since the sealing members 70 and 90 seal the grooves G1 and G2 located on two side walls of the battery stack 30, together with the cooling ducts 110, 130, 150, and 170, the air may flow along flow lines F0, F1, F2, and F3 in the battery cartridges 20 and the cooling ducts 110, 130, 150, and 170.

Here, the flow line F0 displays flow of air introduced to the cooling ducts 110 and 130. Also, the flow lines F1 and F2 display flow of air inside each of the battery cartridges 20, and the flow line F3 display flow of air discharged from the cooling ducts 150 and 170.

Accordingly, the air may uniformly and quickly cool the battery cells 4 and 8 provided between the battery cartridges 20 through the cooling ducts 110, 130, 150, and 170, and the air paths located inside the battery cartridges 20 such that the cooling ducts 110, 130, 150, and 170 communicate with each other.

The scope of the present disclosure is indicated by the claims which will be described in the following rather than the detailed description of the disclosure, and it should be understood that the claims and all modifications or modified forms drawn from the concept of the claims are included in the scope of the present disclosure.

What is claimed is:

1. A battery module comprising:
   a battery stack comprising: battery cartridges each having an outer frame with grooves that are recessed from side surfaces of the battery cartridges and extending vertically at the side surfaces, air induction holes located adjacent to bottoms of the grooves, and air paths communicating with openings of the air induction holes, and at least one battery cell alternately stacked with each battery cartridge of the battery cartridges;
   a sealing member comprising an outer sealing frame, sealing ribs, and middle sealing frames, the outer sealing frame being located along edges of the grooves of the battery stack, the sealing ribs perpendicularly protruding from the outer sealing frame around boundaries of adjacent grooves, and the middle sealing frames being located between adjacent air induction holes; and a cooling duct comprising an air access hole covering the grooves and communicating with the air induction holes, and comprising a groove portion located along the outer sealing frame to accommodate the outer sealing frame, wherein the grooves are recessed by a depth into the side surfaces of the battery cartridges, and wherein the grooves each have first and second internal walls parallel to a stacked direction of the battery cartridges.

2. The battery module of claim 1, wherein the grooves of adjacent battery cartridges are located at two facing side surfaces of the adjacent battery cartridges among the battery cartridges.

3. The battery module of claim 1, wherein two grooves of adjacent battery cartridges are located at each of two facing side surfaces of the adjacent battery cartridges among the battery cartridges.

4. The battery module of claim 1, wherein the air induction holes comprise rectangular walls defining the openings.

5. The battery module of claim 4, wherein the rectangular walls comprise pairs of base walls having inclines forming certain angles with the bottoms of the grooves and spaced apart from each other by heights of the openings, and pairs of flanges connecting two end portions of the pairs of base walls.

6. The battery module of claim 1, wherein each battery cartridge includes a lower cooling fin and an upper cooling fin so that the battery cartridges comprise the air paths between lower cooling fins and upper cooling fins spaced apart from each other at certain intervals, and edges of the lower cooling fins and edges of the upper cooling fins are fixed to borders of the battery cartridges.

7. The battery module of claim 1, wherein the outer sealing frame is formed in a quadrangular shape and is located at the bottoms of the grooves that are on the side surfaces of the battery cartridges, and the outer sealing frame is disposed at an outer periphery of each of the battery cartridges.

8. The battery module of claim 1, wherein the sealing ribs are located roughly parallel to the boundaries of the grooves, on the side surfaces of the battery cartridges.

9. The battery module of claim 1, wherein the middle sealing frames are located along boundaries of the adjacent air induction holes to contact the corresponding sealing ribs.

10. The battery module of claim 1, wherein the cooling duct comprises a pair of connector boards defining the groove portion.

11. The battery module of claim 10, wherein the cooling duct is adhered to the battery cartridges through the pair of connector boards to cover the grooves.

12. The battery module of claim 10, wherein the pair of connector boards protrude from the cooling duct towards the grooves.

13. The battery module of claim 10, wherein the cooling duct further comprises accommodation boards respectively located perpendicular to the pair of connector boards and extending from the pair of connector boards to two side portions, and wherein the accommodation boards are fixed to side walls of the battery stack around the grooves.

14. The battery module of claim 1, wherein a thickness of the cooling duct decreases from an upper portion to a lower portion of the cooling duct when viewed from a stack direction of the battery cartridges.

15. The battery module of claim 1, wherein the grooves accommodate the sealing member between the first and second internal walls and the bottoms of the grooves in the battery cartridges.

16. The battery module of claim 1, wherein the grooves communicate with each other along a stacked direction of the battery cartridges.

* * * * *